United States Patent
Harada et al.

[11] Patent Number: 5,998,002
[45] Date of Patent: Dec. 7, 1999

[54] HIGH-DENSITY MAGNETIC RECORDING MEDIUM

[75] Inventors: Takashi Harada; Chikakazu Kawaguchi, both of Nagahama, Japan

[73] Assignees: Mitsubishi Polyester Film Corporation; TDK Corporation, both of Tokyo, Japan

[21] Appl. No.: 08/844,890

[22] Filed: Apr. 22, 1997

Related U.S. Application Data

[63] Continuation-in-part of application No. 08/570,875, Dec. 12, 1995, abandoned.

[51] Int. Cl.$^6$ ............................................. G11B 5/704
[52] U.S. Cl. ..................... 428/216; 428/323; 428/336; 428/480; 428/694 SL; 428/694 BS
[58] Field of Search ........................ 428/213, 216, 428/323, 336, 480, 694 BB, 694 SL, 694 BS, 900

[56] References Cited

U.S. PATENT DOCUMENTS

| | | | |
|---|---|---|---|
| 4,795,672 | 1/1989 | Takeda et al. | 428/216 |
| 5,206,084 | 4/1993 | Takeda et al. | 428/336 |
| 5,503,911 | 4/1996 | Aoki et al. | 428/213 |
| 5,532,049 | 7/1996 | Masuda et al. | 428/216 |

FOREIGN PATENT DOCUMENTS

| | | |
|---|---|---|
| 0 541 072 | 5/1993 | European Pat. Off. . |
| 30-5639 | 8/1955 | Japan . |
| 4-271016 | 9/1992 | Japan . |
| 5-28464 | 2/1993 | Japan . |

*Primary Examiner*—Stevan A. Resan
*Attorney, Agent, or Firm*—Foley & Lardner

[57] ABSTRACT

The present invention relates to a magnetic recording medium comprising:

as a support film a biaxially oriented polyester film comprising a polyester base film and a coating layer provided on the surface of the base film during the film forming process, and a magnetic layer comprising a magnetic substance dispersed in a resin binder, formed on the surface of said coating layer and having the thickness t ($\mu$m) of said coating layer, the thickness tM ($\mu$m) of said magnetic layer and the average center line roughness (sRa (nm)) of the surface of said magnetic layer, which satisfy the following formulae (1)–(4);

$$0.01 \leq tM \leq 2.0 \quad (1)$$

$$0.05 \leq t \leq 1.39 \quad (2)$$

$$0.1 < t+tM \leq 1.4 \quad (3)$$

$$sRa < 10 \quad (4)$$

11 Claims, No Drawings

HIGH-DENSITY MAGNETIC RECORDING MEDIUM

CROSS REFERENCE TO RELATED APPLICATION

This is a continuation-in-part of application Ser. No. 08/570,875, filed Dec. 12, 1995 now abandoned.

BACKGROUND OF THE INVENTION

The present invention relates to a magnetic recording medium suited for high-density recording.

Recently, in the magnetic recording media such as VTR tapes, audio tapes and computer tapes, there have been rising necessity of higher recording density to meet the requests for higher performance, longer recording time and miniaturization and light-weight of the recording media.

Shortening of the recording wavelength is essential for high-density recording, but when the thickness of the magnetic layer exceeds a certain level of thickness in relation to a particular recording wavelength, the magnetic flux of the magnetic substance in the depth of the layer is unable to pass through the reproducing head and forms a closed loop, resulting in a loss of the magnetic flux. Therefore, in principle, it is advantageous for magnetic recording that the more the recording wavelength is shortened, the more the magnetic layer is thinned. Based on this concept, an ME (metal evaporation) type magnetic recording medium has been developed in which the magnetic layer is formed with an extremely small thickness by depositing a ferromagnetic metal by a pertinent method such as evaporation or sputtering to realize the reduction of the magnetic flux loss by the thickness resulting from shortening of the recording wavelength.

However, this ME type magnetic recording medium is at a disadvantage in that the ferromagnetic metal film using cobalt, nickel or a mixture thereof used as magnetic substance tends to gather rust. Therefore, despite various proposals of improvement, this type of magnetic recording medium still lacks reliability for long-time preservation of recording.

On the other hand, in the case of the MP (metal powder) type magnetic recording medium in which a ferromagnetic metal is used as magnetic substance and this magnetic substance is dispersed in a resin binder and applied on a support film, it is relatively easy to take a measure against rusting, such as forming an anti-oxidizing film on the metal particle surfaces.

In the case of the coated type magnetic recording medium, however, there are involved the problems in coating, such as formation of pinholes or streaks, when the magnetic layer is reduced in thickness. It is also a negative factor against thickness reduction of the magnetic layer that it is hardly possible to increase the fill of the magnetic substance because of use of a resin binder containing various additives.

As a solution to these problems of the coated type magnetic recording medium, there has been proposed a magnetic recording medium in which the magnetic layer coated on the support film is divided into two layers so that a lower non-magnetic layer will be provided on the support film and an upper magnetic layer will be provided on the said non-magnetic layer. (See, for example, JP-A 4-270106 and JP-A 5-28464).

However, in the case where the magnetic layer is divided into two layers and the two layers are formed simultaneously by coating, disturbance tends to occur at the interface between the lower non-magnetic layer and the upper magnetic layer, resulting in generation of tape modulation noise. It has been proposed to first form the lower non-magnetic layer and then form the upper magnetic layer thereon while the lower non-magnetic layer is still in a wet state. This method, however, is still incapable of perfectly preventing disturbance at the interface, and further improvements have been desired.

As a result of the present inventors' earnest studies on the subject matter, it has been found that by forming a coating layer on the surface of a biaxially oriented polyester film composed of a polyester base film as a support film during the film forming process by an in-line coating method, the said coating layer being formed by an in-line coating method in the film forming process, and calendering the coated film to flatten its surface so as to satisfy the relations of the following formulae (1)–(4) in the said layers, the obtained magnetic recording medium has excellent adhesion between the polyester film and the coating layer, and is suited for use as a high-density recording medium in the shorter wavelength recording.

$$0.01 \leq tM \leq 1.35 \tag{1}$$

$$0.05 \leq t \leq 1.39 \tag{2}$$

$$0.1 < t + tM \leq 1.4 \tag{3}$$

$$sRa < 10 \tag{4}$$

(wherein t ($\mu$m) is thickness of the coating layer, tM ($\mu$m) is thickness of the magnetic layer and sRa (nm) is the average center line roughness of the surface of the said magnetic layer). The present invention has been attained on the basis of the above finding.

SUMMARY OF THE INVENTION

The object of the present invention is to provide a magnetic recording medium which enables realization of shortening of the recording wavelength and high recording density.

To accomplish the aim, in a first aspect of the present invention, there is provided a magnetic recording medium which comprises a biaxially oriented polyester film as a support film, which comprises of a polyester base film and a coating layer provided on the surface of the base film during the film forming process, and a magnetic layer comprising a magnetic substance dispersed in a resin binder, formed on the surface of the said coating layer;

which has the thickness t ($\mu$m) of the said coating layer, the thickness tM ($\mu$m) of the said magnetic layer and the average center line roughness (sRa (nm)) of the surface of the said magnetic layer, which t, tM and sRa satisfy the following formulae (1)–(4); and $$0.01 \leq tM \leq 1.35 \tag{1}$$

$$0.05 \leq t \leq 1.39 \tag{2}$$

$$0.1 < t + tM \leq 1.4 \tag{3}$$

$$sRa < 10 \tag{4}$$

In a second aspect of the present invention, there is provided a magnetic recording medium comprising:
as a support film, a biaxially oriented polyester film comprising a polyester base film, and a coating layer provided on the surface of the base film during the film forming process, which contains inorganic particles of silica, silica sol, alumina, alumina sol, zirconium sol, kaolin, talc, calcium carbonate, calcium phosphate, titanium oxide, barium sulfate, carbon black, molybdenum sulfide or antimony oxide sol, or organic particles which are the crosslinked polymer particles; and a magnetic layer comprising a magnetic substance dispersed in a resin binder, formed on the surface of said coating layer, and having the thickness t ($\mu$m) of said coating layer, the thickness tM ($\mu$m) of said magnetic layer and the average center line roughness (sRa (nm)) of the surface of said magnetic layer, which satisfy the following formulae (1)–(4);

$0.01 \leq tM \leq 1.35$ (1)

$0.05 \leq t \leq 1.39$ (2)

$0.1 < t+tM \leq 1.4$ (3)

$sRa < 10$ (4)

the magnetic recording medium being produced by a process comprising:

forming a coating layer on the surface of a biaxially oriented polyester film composed of a polyester base film as a support film during the film forming process, applying a magnetic coating material on the surface of said coating layer of said support film, being subjected to magnetic field orientation, drying to evaporate solvent, and calendering to flatten the surface of said coating layer, so that t, tM and sRa satisfy the above-mentioned formulae (1)–(4).

$0.01 \leq tM \leq 1.35$ (1)

$0.05 \leq t \leq 1.39$ (2)

$0.1 < t+tM \leq 1.4$ (3)

$sRa < 10$ (4)

DETAILED DESCRIPTION OF THE INVENTION

In the magnetic recording medium according to the present invention, a biaxially oriented polyester film is used as a substrate, and this biaxially oriented polyester film comprises a polyester base film and a layer formed on one side of the polyester base film by coating in the film forming process. (This biaxially oriented polyester film having a laminated coating layer may hereinafter be referred to simply as support film).

In the present invention, the coating layer of the support film is preferably composed of a resin having adhesiveness to the magnetic coating material applied thereon. It is also preferable that the resin used for the said coating layer is one which is plastically deformed and flattened when the laminated film is calendered for flattening the surface of the magnetic layer. Examples of such resins are polyesters, polyamides, polystyrene polyacrylates, polycarbonates, polyarylates, polyvinyl chloride, polyvinylidene chloride, polyvinyl butyral, polyvinyl alcohol, polyurethanes, and copolymers or mixtures of these resins. Of these resins, polyester-based resins are most preferred.

As the components of such polyester-based resins, there can be used the polyvalent carboxylic acids and polyvalent hydroxyl compounds such as mentioned below. Examples of the polyvalent carboxylic acids usable here include terephthalic acid, isophthalic acid, orthophthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, trimellitic acid monopotassium salt, and ester forming derivatives of the above acids. Examples of the polyvalent hydroxyl compounds include ethylene glycol, 1,2-propylene glycol, 1,3-propylene glycol, 1,3-propanediol, 1,4-butanediol, 1,6-hexanediol, 2-methyl-1,5-pentanediolneopentyl glycol, 1,4-cyclohexanedimethanol, p-xylylene glycol, bisphenol A-ethylene glycol adduct, diethylene glycol, triethylene glycol, polyethylene glycol, polypropylene glycol, polytetraethylene oxide glycol, dimethylolpropionic acid, glycerin, trimethylolpropane, sodium dimethylolethylsulfonate, and potassium dimethylolpropionate.

At least one of the said polyvalent carboxylic acids and at least one of the said polyvalent hydroxyl compounds are properly selected and subjected to an ordinary polycondensation to synthesize a polyester resin. The materials other than those mentioned above, such as so-called acrylic graft polyesters disclosed in JP-A 1-165633 and the composite polymers having a polyester material such as polyester polyurethane obtained by chain-lengthening a polyester polyol with an isocyanate, are also included in the polyester resins usable for composing the coating layer of the support film in the present invention. Commercial products of polyester resin, such as RZ-105 produced by Goo Chemical Industries Co., Ltd. are also usable in the present invention.

In the present invention, it is preferable in the viewpoint of safety and hygiene that the above-mentioned resins, be prepared into a coating solution using water as a medium, but an organic solvent may be contained as an assistant of water-soluble or water-dispersible resin within scope which does not exert bad influence upon the safety and hygiene.

In case of using water as medium, the coating solution may be one prepared by forcibly dispersing such resin with a surfactant or other agent, but preferably the coating solution is prepared by using a self-dispersion type resin having a hydrophilic nonionic component such as polyethers or a cationic group such as quaternary ammonium salt, more preferably using a water-soluble or water-dispersible resin having an anionic group. The "water-soluble or water-dispersible resin having an anionic group" used in the present invention is ones obtained by bonding a compound having an anionic group to skeleton resin by means of copolymerization or grafting. The anionic group may be properly selected from sulfonic acid, carboxylic acid, phosphoric acid and their salts.

For imparting water solubility to the resin, the counter ion of the anionic group used in the present invention is preferably an alkali metal ion, but in view of moist heat resistance, such counter ion can be selected from the amine-based onium ions including ammonium ion. The content of the anionic group in the water-soluble or water-dispersible resin having an anionic group is preferably in the range of 0.05 to 8% by weight.

Usually calendering is carried out at 60 to 100° C. under a linear pressure of about 100 to 300 Kg/cm, so that for effecting the desired plastic deformation of the coating layer, it is recommended to select the resin composition so that the layer composing resin has a glass transition temperature of not more than 60° C., preferably not more than 50° C., and a Vicat softening temperature of not more than 60° C., preferably not more than 50° C.

It is preferred that the coating solution used for forming a coating layer on the polyester base film in the present invention contains inorganic or organic particles. As the inorganic particles, there can be used particles of silica, silica sol, alumina, alumina sol, zirconium sol, kaolin, talc, calcium carbonate, calcium phosphate, titanium oxide, barium sulfate, carbon black, molybdenum sulfide, antimony oxide sol and the like, preferably particles of silica and calcium carbonate. As the organic particles, there can be used fine particles composed of polystyrene, polyethylene, polyamides, polyesters, polyacrylic esters and epoxy resin, fine particles composed of homopolymers or copolymers such as vinyl acetate or vinyl chloride, which may contain a crosslinking agent, and fine particles of silicone resin, fluorine resin and the like. The organic particles are preferably the crosslinked polymer particles which are resistant to thermal deformation. Examples of the said crosslinked polymer particles include the particles of copolymers of monovinyl compounds having one aliphatic unsaturated bond in the molecule and compounds having two or more aliphatic unsaturated bonds in the molecule as crosslinking agent. Fine particles of thermosetting phenol resins, thermosetting epoxy resins, thermosetting urea resins, benzoguanamine resins and the like are also usable. The organic particles may be of a multi-layer structure.

The plastic deformation of the coating layer by the calendering is smoothly conducted by using of organic particles.

One kind or a mixture of two or more kinds of the said particles may be used in the present invention.

The particle size is preferably less than the thickness of the coating layer, such as 0.001 to 3.0 μm, preferably 0.01 to 1.0 μm in average particle diameter. The particles greater than the coating layer thickness may form projections and, further, may hinder flattening of the magnetic layer surface when the coating layer is calendered for plastic deformation.

The content of the particles contained in the coating solution is 10 to 60 wt %, preferably 20 to 50 wt %, more preferably 30 to 50 wt % in terms of solid content. When the content of the particles exceeds 60 wt %, the adhesion between the coating layer and the polyester base film is weakened or the strength of the coating layer is reduced to cause abrasion of the layer. When the content of the particles is less than 10 wt %, the plastic deformation of the coating layer by the calendering is not carried out satisfactory.

For improving anti-block properties, water resistance, solvent resistance and mechanical properties of the coating layer, there may be contained as crosslinking agent a hydroxymethylated or alkoxymethylated urea-based compound, melamine-based compound, guanamine-based compound, acrylamide-based compound, polyamide-based compound, epoxy compound, aziridine compound, blocked polyisocyanate, silane coupling agent, titanium coupling agent, zirco-aluminate coupling agent, peroxide, heat- or light-reactive vinyl compound, photosensitive resin or the like. It is also possible to contain other additives such as defoaming agent, applicability improver, thickening agent, antistatic agent, antioxidant, ultraviolet absorber, foaming agent, dye, pigment and the like, without affecting the effect of the present invention.

The support film of the magnetic recording medium according to the present invention has the coating layer on one side thereof. In the case of the structure: coating layer/substrate/coating layer, when calendering is carried out after the magnetic layer has been formed on one side, there may take place troubles such as sticking of the calender roll to the coating layer on the side where no magnetic layer is provided, or sticking between the magnetic layer and the coating layer on the side where no magnetic layer is provided when the film is wound up. Therefore, it is desirable that the coating layer be present on one side alone of the polyester base film.

"Polyester" in the polyester film used as the support film in the present invention refers to the polyesters obtained from polymerization using dicarboxylic acids such as terephthalic acid, 2,6-naphthalenedicarboxylic acid, etc., or their esters, and ethylene glycol as main starting materials, but such polyesters may contain a third component. The dicarboxylic acids usable here include isophthalic acid, terephthalic acid, 2,6-naphthalenedicarboxylic acid, adipic acid and sebacic acid, and the glycols usable as another starting material include diethylene glycol, propylene glycol, butanediol, 1,4-cyclohexanedimethanol and neopentyl glycol. In either case, the polyester used in the present invention is the one in which not less than 80% of the sequences is constituted by ethylene terephthalate units or ethylene-2,6-naphthalate units, preferably, ethylene-2,6-naphthalate units because of the good stability of the film quality.

If necessary, fine particles may be contained in the polyester film. For instance, fine particles of titanium oxide, carbon black, calcium carbonate, barium sulfate or the like may be contained for the purpose of affording a light screening property to the support film. Also, inorganic particles such as particles of calcium carbonate, calcium phosphate, barium sulfate, titanium oxide, kaolin, talc, clay, alumina, silica, carbon black or the like, or crosslinked organic particles such as particles of crosslinked polystyrene resin, crosslinked acrylic resin or the like may be allowed to exist in the support film for affording desired slip property to the film. One kind alone of the said fine particles, or two or more kinds thereof may be used in admixture. The average size (diameter) of these particles is usually in a range of 0.001 to 5.0 μm, preferably 0.01 to 1.0 μm, and the content thereof in the support film is usually not more than 10 wt %, preferably not more than 5 wt %.

The polyester base film used in the present invention may have at least two-layers laminating film construction by coextrusion or other means.

The support film of the magnetic recording medium according to the present invention is biaxially oriented by biannual stretching so that the film will have a Young's modulus of not less than 350 kg/mm$^2$, preferably not less than 450 kg/cm$^2$ in both longitudinal and transverse directions. Particularly when it is necessary to reduce the support film thickness for long-time recording, it is preferable that the film have a Young's modulus of not less than 500 kg/mm$^2$ in the longitudinal direction.

After biannual stretching, the heat setting of the resultant film is carried out so that the shrink ratio of the film after a 3-minute heat treatment at 100° C. will be not greater than 2.0% in both longitudinal and transverse directions.

The magnetic layer of the magnetic recording medium according to the present invention is composed of a magnetic substance dispersed in a resin binder.

Powder of a known ferromagnetic substance employed for high-density magnetic recording in the art can be used as magnetic substance in the present invention. For instance, acicular powders of γ-iron oxide, Co-added γ-iron oxide, chrome oxide and the like can be mentioned as examples of the metal oxide type or different metal-added metal oxide type magnetic substances. Cobalt, nickel, iron and their alloys or alloys thereof with chromium or tungsten can be mentioned as examples of the ferromagnetic metals, and plates of Ba ferrite, Sr ferrite and the like can be mentioned as examples of the hexagonal system ferrite type magnetic substances. These particles of ferromagnetic substances preferably have a coercive force Hc of not less than 1,000 Oe, more preferably not less than 1,200 Oe. Especially the ferromagnetic metal particles are preferably ones which have been subjected to known anti-oxidizing film coating on the surfaces.

The resin binder used for dispersing the particles of the said ferromagnetic substances and the organic or inorganic additives such as crosslinking agent, lubricant, antistatic agent, abrasive, antioxidant, mildewproofing agent, etc., can be selected from the known ones.

Also, known methods can be employed for applying a magnetic coating material containing the said magnetic substance, resin binder and additives on the surface of the coating layer of the support film.

The applied magnetic coating is dried to evaporate the solvent after magnetic field orientation of the magnetic substance, followed by calendering to flatten the surface of the coating layer. Calendering can be accomplished by a known method using, for example, supercalender rolls. This calendering treatment is carried out at a temperature of not less than 70° C. preferably not less than 80° C., under a linear pressure of not less than 200 kg/cm, preferably not less than 300 kg/cm, to obtain a desired plastic deformation of the coating layer. If the coating layer is given no plastic deformation by calendering, the surface of the magnetic layer provided on the coating layer will be roughened as the unevenness of the support film is transferred thereto, resulting in deterioration of the electromagnetic conversion efficiency of the produced recording medium.

In the present invention, it is essential that the thickness $t$ ($\mu$m) of the said coating layer, the thickness $tM$ ($\mu$m) of the said magnetic layer and the average center line roughness ($sRa$ (nm)) of the surface of the said magnetic layer satisfy the following formulae (1)–(4):

$$0.01 \leq tM \leq 1.35 \tag{1}$$

$$0.05 \leq t \leq 1.39 \tag{2}$$

$$0.1 < t+tM \leq 1.4 \tag{3}$$

$$sRa < 10 \tag{4}$$

Preferably, $tM$ is 0.05 to 1.2 $\mu$m. When $tM$ exceeds 1.35 $\mu$m, a closed loop tends to occur in the magnetic substance in the depth of the layer during short wavelength recording, whilst when $tM$ is less than 0.01 $\mu$m, the output performance of the recording medium lowers excessively because the coating can not be carried out uniformly by present coating technique and the thickness of the magnetic layer is greatly variable. Also, when $t$ is less than 0.05 $\mu$m, flattening of the coating layer by calendering is unsatisfactory. Further, when $t+tM$ exceeds 1.4 $\mu$m, it is not preferable because the overall thickness of the magnetic recording medium becomes too large and its strength is reduced. Preferably, $t+tM$ is 0.1 to 1.3 $\mu$m, more preferably 0.15 to 1.2 $\mu$m, even more preferably not more than 0.2 to 1.1 $\mu$m.

The average center line roughness ($sRa$) of the surface of the magnetic layer of the magnetic recording medium according to the present invention is less than 10 nm, preferably less than 9 nm, more preferably less than 8 nm. When $sRa$ of the magnetic layer surface is not less than 10 nm, the spacing loss between the magnetic head and the magnetic layer surface is enlarged to deteriorate the electromagnetic conversion efficiency of the magnetic recording medium.

Further, in the present invention, it is preferable to satisfy the following formula (5).

$$0 < t/tM \leq 2.5 \tag{5}$$

If the $t/tM$ is more than 2.5, the strength of magnetic recording medium is reduced and the productivity of the film is deteriorated.

The magnetic recording medium of the present invention may be provided with the known type of back coat layer on the side opposite from the magnetic layer applied side. This back coat layer may be formed by applying a coating composition comprising a resin binder and fine particles of a pertinent material such as carbon black, alumina, etc., with additives such as antistatic agent, lubricant, etc., on the support film for the purpose of imparting good running property to the magnetic tape.

A process for forming the support film used in the magnetic recording medium according to the present invention is described below.

The support film according to the present invention is composed of a base polyester film and a coating layer formed thereon. The polyester film used in the present invention is one obtained by using a polyester defined above as starting material, and a known method can be employed for the forming such a polyester film. For instance, the starting material is melt-extruded into a sheet at 270 to 320° C. and then cooled and solidified at 40 to 80° C. to form an amorphous sheet. This sheet is stretched 4 to 20 times in terms of an area stretch ratio in both machine and transverse directions either successively or simultaneously, and then, the heat treatment of the stretched film is carried out at 160 to 250° C. (the method described in JP-B 30-5639). After biannual stretching, the sheet may be restretched in either direction before proceeding to the next heat treatment step.

In the present invention, the coating layer is formed by an in-line coating method in which coating is performed in the film forming process. When an off-line coating method is used, there can not be obtained a satisfactory adhesive force between the film and the coating layer, causing peeling-off of the coating layer in the process or ununiformity of the coating layer thickness. Further, according to the in-line coating method, since coating is accomplished simultaneously with film formation, the production cost is lower than that of off-line coating method in which coating is conducted after formation of the film.

Coating by the said in-line coating method can be conducted by use of appropriate coating devices such as reverse roll coater, gravure coater, air doctor coater, etc., such as illustrated in Y. Harasaki: Coating Systems, Maki Shoten, 1979.

For carrying out coating in the film forming process, the following methods can be employed for instance: the coating solution is applied on an unstretched polyester film and then the film is biaxially stretched either successively or simultaneously; the coating solution is applied on a monoaxially stretched film and then the film is stretched in the direction orthogonal to the initial monoaxial stretching direction; the coating solution is applied on a biaxially stretched polyester film and then the film is further stretched in the transverse direction and/or the machine direction.

As described above, in the magnetic recording medium according to the present invention, a coating layer which is subject to plastic deformation by calendering is formed on the surface of the support film, so that the said coating layer and the magnetic layer formed the base film can be flattened simultaneously by calendering. Therefore, even if the magnetic layer thickness is reduced for lessening the magnetic flux loss by the thickness, the magnetic layer surface can be flattened effectively, so that the produced magnetic recording medium is suited for use as a high-density recording medium which requires short wavelength recording.

Further, since the coating layer subject to plastic deformation by calendering is formed by applying the coating composition on a polyester film according to an in-line coating method, adhesiveness of the coating layer to the polyester is good and there are not involved difficulties for control of adhesiveness in the case of a multi-layer coated magnetic layer, so that it is possible to produce the high-density recording medium at high efficiency according to a conventional process.

The magnetic recording medium of the present invention is produced by the above process and it is preferable to produce the magnetic recording medium so that t, tM and sRa satisfy the above-mentioned formulae (1)–(4).

$$0.01 \leq tM \leq 1.35 \quad (1)$$

$$0.05 \leq t \leq 1.39 \quad (2)$$

$$0.1 < t + tM \leq 1.4 \quad (3)$$

$$sRa < 10 \quad (4)$$

The magnetic recording medium of the present invention is useful not only as VHS system VTR tape but also as other types of recording tape such as S-VHS tape, W-VHS tape, 8 mm videotape, high-band 8 mm videotape, digital VTR tape for HDTV, digital VTR tape for commercial use, computer tape, floppy disc and the like.

EXAMPLES

The present invention is explained in more detail in the following Examples, but it should be recognized that the scope of the present invention is not restricted to these Examples.

The physical properties of the support film and the performance of the magnetic recording medium shown in the Examples and Comparative Examples were determined by the methods described below. Also, in the following Examples and Comparative Examples, all "part" and "parts" are by weight unless otherwise noted.

(1) Lamination layer thickness

A sample of magnetic recording medium or support film was fixed by embedding it in a resin so that its section in the thickness direction could be observed, and a 100 nm thick specimen was prepared therefrom using a microtome and observed by a transmission electron microscope H-9000 (mfd. by Hitachi Corp., X10,000–20,000 magnification; accelerating voltage: 100 kV) to determine the thickness of each lamination.

(2) Average center line roughness (sRa) of magnetic layer surface

The average center line roughness (sRa) of the surface of the magnetic layer of the magnetic recording medium was determined using a non-contact roughness tester. A three-dimensional roughness tester MAXIMIID 5800 (mfd. by Zygo Corp.) was used for the measurement.

(3) RF output at 7.7 MHz

The electro-magnetic conversion efficiency was evaluated using a high-band video deck (EV-S900 mfd. by Sony Corp.) and a color video noise meter (925C. mfd. by Shibasoku Co., Ltd.). The RF output at the time of recording or reproduction of a single sinusoidal wave of 7.7 MHz (recording wavelength on the tape=approx. 0.5 μm) was measured. The electromagnetic conversion efficiency was evaluated in terms of relative value (dB) to the evaluation (given as 0.0 dB) of the magnetic tape obtained in Example 1.

(4) Tape modulation noise

The tape modulation noise was measured using the same system as employed for the determination of RF output. C/N of the 0.1 MHz apart frequency was read from the noise spectrum obtained when a single sinusoidal wave of 7.7 MHz was recorded or reproduced. The tape modulation noise was evaluated in terms of relative value (dB) to the valuation (given as 0.0 dB) of the magnetic tape obtained in Example 1.

(5) Young's modulus

A 300 mm long sample tape was pulled at a straining rate of 10%/min in a chamber controlled to 23° C. and 50% RH using a tensile tester INTESCO MODEL 2001 mfd. by Intesco Co., Ltd. to obtain a tensile stress-strain curve. Using the initial straight line part of this curve, the Young's modulus E (kg/mm$^2$) of the tape was calculated from the following equation:

$$E = \Delta\sigma/\Delta\epsilon$$

wherein $\Delta\sigma$ is the difference in stress due to the original average sectional area between two points on the straight line, and $\Delta\epsilon$ is the difference in strain between the said two points.

The sample width was made 20 mm in the case of the support film and equalized to the tape width in the case of the magnetic tape. In the latter case, the average sectional area includes the magnetic layer. The sum of the Young's modulus in the longitudinal direction and that in the transverse direction was determined by adding the values obtained by separately measuring the Young's moduli in the respective directions.

Example 1

Preparation of Polyester

In a reactor 100 parts of dimethyl terephthalate, 65 parts of ethylene glycol and 0.09 part of magnesium acetate were heated to carry out an ester exchange reaction with methanol being distilled away. The mixture was heated to 230° C. in approximately 4 hours after start of the reaction to substantially complete the ester exchange reaction. Then 0.1 part of silica particles having an average diameter of 0.12 μm were added in the form of an ethylene glycol slurry, followed by further addition of 0.4 part of ethyl acid phosphate and 0.04 part of antimony trioxide, and the reaction system was heated while reducing the pressure gradually from atmospheric pressure until finally reaching 1 mmHg and 285° C. Four hours later, the reaction system was returned to atmospheric pressure and a polyester resin having an intrinsic viscosity of 0.660 was obtained.

Production of Polyester Film

The polyester obtained in the manner described above was dried at 180° C. for 4 hours, melted at an extrusion temperature of 290° C., passed through a #2,000-mesh filter, extruded into a sheet from the slot die and cooled and solidified on a 40° C. casting roll using the electrostatic adhesion technique to obtain an amorphous sheet. This amorphous sheet was roll stretched 2.9 times in the longitudinal direction at 83° C., followed by additional 1.3-time roll-stretching in the same direction at 76° C. On the surface of the resulting film was bar coated a coating solution comprising 60 parts (solid weight) of a water dispersion of a polyester comprising a dicarboxylic acid moiety consisting of 56 mol % of terephthalic acid, 40 mol % of isophthalic acid and 4 mol % of 5-sodiumsulfoisophthalic acid and a glycol moiety consisting of 70 mol % of ethylene glycol, 13 mol % of diethylene glycol and 17 mol % of 1,4-butanediol, and 40 parts of organic particles having an average diameter of 0.04 μm. This coated film was tentered 4.0 times in the width direction at 100° C. and then carried out the heat setting at 210° C. for 15 seconds to give a biaxially oriented polyester film having a coating layer thickness of 0.2 μm and a base polyester film thickness of 9.8 μm. The Young's modulus of this support film (total of the module in the longitudinal and transverse directions) was 1,000 kg/mm$^2$.

Manufacture of Magnetic Tape

After kneader treatment of the all or a part of following composition is carried out in a kneader completely, the mixing, dispersing and diluting of the mixture are carried out by a sand grinder mill. And then, by the adding of 3.3 parts of Coronate L mfd. by Nippon Polyurethane Industry Co., as a curing agent, the magnetic coating material is obtained.

TABLE 1

Composition of the magnetic coating material

| | |
|---|---|
| Magnetic powder of ferromagnetic metal Fe/Co/Al/Y = 100/20/4.2/5.3 (by weight) HC = 2,000 [Oe]; σ$_s$ = 140 emu/g average longitudinal diameter = 0.08 μm acicularity = 5 | 100 parts |
| Vinyl chloride resin (MR-110 mfd. by Nihon Zeon Co., Ltd.) | 8.3 parts |
| Polyester-Polyurethane resin (UR-8300 mfd. by Toyo Boseki Co., Ltd.) | 8.3 parts |
| Stearic acid | 1 part |
| Butyl stearate | 1 part |
| α-alumina | 5 parts |
| Toluene | 111 parts |
| Methyl ethyl ketone | 111 parts |
| Cyclohexanone | 74 parts |

This magnetic coating material was applied on the polyester coated side of the biaxially oriented polyester film so as to have a dry magnetic coating thickness shown in Table 3, and then the coated surface of the film was subjected to magnetic field orientation, drying and calendering. The calender rolls used for calendering comprised hard chrome plated metal rolls and polyester resin-made opposite rolls. The metal rolls were kept at 100° C. and arranged so that the magnetic coating material would contact the rolls under a linear pressure of 300 kg/cm. Plastic deformation and flattening of the polyester coating layer and planishing of the magnetic layer were accomplished simultaneously by the said calendering.

On the diamagnetic side of the said magnetic tape was applied a back coat of the following composition, which had previously been mixed and dispersed in a ball mill for 48 hours, so as to have a dry coating thickness of 0.5 μm, followed by drying.

TABLE 2

Composition of back coat

| | |
|---|---|
| Carbon-1 (Conductex SC ULTRA mfd. by Columbian Chemicals Company, average particle diameter = 21 nm, BET = 220 m$^2$/g) | 80 parts |
| Carbon-2 (Sevacarb MT mfd. by Colombian Chemicals Company., average particle diameter = 350 nm, BET = 8 m$^2$/g) | 1 parts |
| α-iron oxide (TF-100 mfd. by Toda Kogyo Co., average particle diameter = 0.1 μm) | 1 parts |
| Copolymer A including vinyl chloride (MPR-TA mfd. by Nishin Chemical Industry Co., Ltd. (copolymer of vinyl chloride, vinyl acetate and vinyl alcohol), polymerization degree = 420) | 40 parts |
| Copolymer B including vinyl chloride (MPR-ANO(L) mfd. by Nishin Chemical Industry Co., Ltd. (copolymer of vinyl chloride, vinyl acetate and vinyl alcohol), containing 390 ppm nitrogen atom, polymerization degree = 340) | 25 parts |
| Polyester-Polyurethane resin (TS9555 mfd. by Toyo Boseki Co., Ltd., containing —SO$_3$Na, number average molecular weight = 40,000 | 35 parts |
| Methyl ethyl ketone | 700 parts |
| Toluene | 400 parts |
| Cyclohexane | 300 parts |

This magnetic tape was slit into an 8 mm width and incorporated in an 8 mm tape cassette to make a VTR tape.

The characteristic features of the obtained VTR tape are shown in Table 3. Since the polyester coating layer was plastically deformed and flattened by calendering, the magnetic layer surface was also flat even though its thickness was less than 1 μm, and consequently the tape properties is improved in RF output and modulation noise.

Example 2

The procedure of Example 1 was carried out except that the amounts of the water dispersion of polyester and the organic particles used for the coating solution were changed to 80 parts and 20 parts, respectively, to obtain a biaxially oriented support film. The Young's modulus of this support film (total of the moduli in the longitudinal and transverse directions) was 1,010 kg/mm$^2$.

Example 3

The procedure of Example 1 was followed except that the polyester coating layer thickness was made 0.2 μm to obtain a support film. The Young's modulus of this support film (total of the moduli in the longitudinal and transverse directions) was 980 kg/mm$^2$. A magnetic layer of the same composition in the same way as in Example 1 to have a coating thickness shown in Table 3 was provided on this support film. Further, on the opposite side of the film was formed a back coat same as provided in Example 1, and the film was slit to produce an 8 mm VTR tape.

The characteristic properties of the obtained tape are shown in Table 3. Since the coating layer was plastically deformed and flattened by calendering, the magnetic layer surface was also flat even though its thickness was only 1.0 μm, and consequently the tape properties of RF output and modulation noise is practically satisfactory.

Example 4

The procedure of Example 1 was followed except that the particles blended in the coating layer were changed from the organic particles to 40 parts of silica sol having an average particle diameter of 0.08 μm to obtain a biaxially oriented support film. The Young's modulus of this support film (total of the moduli in the longitudinal and transverse directions) was 1,000 kg/mm$^2$.

Example 5

Using the same polyester resin and the same coating solution as used in Example 1, a support film was obtained in the following way. The polyester sheet was stretched 2.9 times in the longitudinal direction at 83° C., followed by additional 1.2 times stretching in the same direction at 76° C. Then the coating solution was bar coated on the obtained film, and this coated film was tentered 4.0 times in the width direction at 100° C. Thereafter, the film was further stretched 1.25 times in the machine direction at 125° C. using the Teflon-made non-adhesive rolls and again led into a tenter for heat setting at 210° C. for 15 seconds to obtain a biaxially oriented support film having an overall thickness of 7 μm. The Young's modulus of this support film (total of the moduli in the longitudinal and transverse directions) was 1,200 kg/mm$^2$.

Example 6

In a reactor 100 parts of dimethyl 2,6-naphthalenedicarboxylate, 55 parts of ethylene glycol and 0.09 part of magnesium acetate were heated to carry out an ester exchange reaction with methanol being distilled away. The reaction mixture was heated to 230° C. in approximately 4 hours after start of the reaction to substantially complete the ester exchange reaction. Then 0.1 part of silica particles having an average diameter of 0.12 μm were added as an ethylene glycol slurry, followed by further addition of 0.4 part of ethyl acid phosphate and 0.04 part of antimony trioxide, and the reaction system was heated while reducing the pressure gradually from atmospheric pressure until finally reaching 1 mmHg and 290° C. Four hours later, the reaction system was returned to atmospheric pressure to obtain a polyester prepolymer. This prepolymer was subjected to solid state polymerization at 240° C. under nitrogen stream for 7 hours to obtain polyethylene naphthalate (PEN).

The obtained polyester was dried at 180° C. for 4 hours and melt extruded at 290° C. In this operation, the melt was screened by a #2,000-mesh filter, extruded into a sheet from the slot die and cooled and solidified on a 60° C. casting roll using the electrostatic adhesion technique to obtain a non-stretched sheet. This sheet was roll stretched 4.1 times in the longitudinal direction at 128° C. Teflon-made non-adhesive rolls were used for the roll stretching. Then the coating solution of the same composition as used in Example 1 was bar-coated on the obtained film, and this film was led into a tenter and stretched 4.5 times in the width direction at 135° C. The film was further stretched 1.25 times in the machine direction at 153° C. using the Teflon-made non-adhesive rolls and again led into the tenter for heat setting at 210° C. for 15 seconds to obtain a biaxially oriented film having an overall thickness of 6 μm. The Young's modulus of this support film (total of the moduli in the longitudinal and transverse directions) was 1,450 kg/mm$^2$.

A magnetic layer and a back coat of the same compositions in the same way as in Example 1 was provided on this support film, and the coated film was slit to produce an 8 mm VTR tape.

The characteristic properties of this tape are shown in Table 4. Since the coating layer was plastically deformed and flattened by calendering, the magnetic layer surface was also flat even though its thickness was less than 1 μm, and consequently the tape properties was improved in RF output and modulation noise as in Example 1.

Example 7

The procedure of Example 6 was followed except that the coating layer thickness was made 1.0 μm to obtain a support film. The Young's modulus of this support film (total of the moduli in the longitudinal and transverse directions) was 1,400 kg/mm$^2$. A magnetic layer of the same composition as used in Example 1 so as to have a coating thickness shown in Table 4 was provided on this support film. This film was also provided with a back coat in the same way as in Example 1 and then slit to produce an 8 mm VTR tape.

Example 8

Using the same polyester resin and the same coating solution as used in Example 6, a support film was obtained in the following way. The polyester sheet was stretched 4.1 times in the longitudinal direction at 128° C., and the coating solution was-bar coated on the obtained film. This film was tentered 4.2 times in the width direction at 135° C., then further stretched 1.15 times in the machine direction at 153° C. using the Teflon-made non-adhesive rolls and again led into a tenter whereby the film was stretched 1.4 times in the width direction at 210° C. and then, the heat setting was carried out at 220° C. for 15 seconds to obtain a biaxially oriented support film having an overall thickness of 6 μm. The Young's modulus of this support film (total of the moduli in the longitudinal and transverse directions) was 1,430 kg/mm$^2$.

Comparative Example 1

The procedure of Example 1 was followed except that no coating solution was applied in the formation of the support film (providing a support film having no coating layer) to obtain a biaxially oriented polyester film having an overall thickness of 10 μm. The Young's modulus of this support film (total of the moduli in the longitudinal and transverse directions) was 990 kg/mm$^2$.

A magnetic layer and a back coat of the same compositions in the same way as in Example 1 was provided on this support film, and the coated film was slit to produce an 8 mm VTR tape.

The characteristic properties of this VTR tape are shown in Table 5. Since there existed no layer to be plastically deformed and flattened by calendering, the surface roughness of the polyester film was transferred as it was to the magnetic layer surface, so that the tape properties were poor in RF output and modulation noise.

Comparative Example 2

The procedure of Example 1 was followed except for the change of the coating layer thickness in the formation of the support film to obtain a biaxially oriented polyester film having an overall thickness of 10 μm. The Young's modulus of the support film (total of the moduli in the longitudinal and transverse directions) was 1,030 kg/mm$^2$.

This film was subjected to the same operations of forming a magnetic layer and a back coat as in Example 1 except for the change of the magnetic layer thickness, and the coated film was slit to produce an 8 mm VTR tape.

The characteristic properties of this tape are shown in Table 5. Although the coating layer was a layer that could be plastically deformed and flattened by calendering, no satisfactory flattening could be accomplished since the coating layer thickness was less than 0.05 μm. Consequently, the tape properties were poor in RF output and modulation noise.

Comparative Example 3

The procedure of Example 1 was followed except for the change of the coating layer thickness in the formation of the support film and the change of the coating method from bar coating to gravure coating to obtain a biaxially oriented polyester film having an overall thickness of 9 μm. The Young's modulus of the support film (total of the moduli in the longitudinal and transverse directions) was 820 kg/mm².

A magnetic layer (of the thickness shown in Table 5) and a back coat of the same compositions in the same way as in Example 1 was provided on the support film, and the coated film was slit to produce an 8 mm VTR tape.

The characteristic properties of this tape are shown in Table 5. Although the coating layer was plastically deformed and flattened by calendering to provide the flat surface of the magnetic layer, contact between the tape and the magnetic head was unsatisfactory because of the low mechanical strength of the magnetic tape. Consequently, the tape properties were poor in RF output and modulation noise. Also, the elongation of the tape occurred during tape recording and reproduction.

Comparative Example 4

The procedure of Example 6 was followed except that the coating layer thickness was made 0.5 μm to obtain a support film. The Young's modulus of this support film (total of the moduli in the longitudinal and transverse directions) was 1,430 kg/mm². A magnetic layer (of the thickness shown in Table 5) and a back coat of the same compositions in the same way as in Example 1 was provided on the support film, and the coated film was slit to produce an 8 mm VTR tape.

The characteristic properties of this tape are shown in Table 5. In this tape, because of the large thickness of the magnetic layer, the magnetic flux loss by the closed loop was large and consequently the tape properties were poor in RF output and modulation noise characteristics.

TABLE 3

|  | Ex. 1 | Ex. 2 | Ex. 3 | Ex. 4 | Ex. 5 |
| --- | --- | --- | --- | --- | --- |
| Polyester film composition | PET[1] Silica 0.1% | PET[1] Silica 0.1% | PET[1] Silica 0.1% | PET[1] Silica 0.1% | PET[1] Silica 0.1% |
| Coating layer composition | Polyester resin 60 parts Organic particles 40 parts | Polyester resin 80 parts Organic particles 20 parts | Polyester resin 60 parts Organic particles 40 parts | Polyester resin 60 parts Silica sol particles 40 parts | Polyester resin 60 parts Organic particles 40 parts |
| t | 0.2 μm | 0.2 μm | 0.2 μm | 0.2 μm | 0.2 μm |
| Magnetic layer thickness tM | 0.1 μm | 0.5 μm | 1.0 μm | 0.1 μm | 0.2 μm |
| tM + t | 0.3 μm | 0.7 μm | 1.2 μm | 0.3 μm | 0.4 μm |
| Young's modulus in the longitudinal direction[2] | 480 | 500 | 480 | 500 | 620 |
| Magnetic layer surface roughness SRa | 6 nm | 6 nm | 6 nm | 7 nm | 6 nm |
| 7.7 MHz RF output | ±0.0 dB | −0.3 dB | −0.4 dB | −0.1 dB | −0.1 dB |
| Tape modulation noise | ±0.0 dB | ±0.0 dB | −0.1 dB | ±0.0 dB | ±0.0 dB |

[1] polyester resin
[2] Young's modulus in the longitudinal direction of the magnetic tape (kg/mm²)

TABLE 4

|  | Ex. 6 | Ex. 7 | Ex. 8 |
| --- | --- | --- | --- |
| Polyester film composition | PEN Silica 0.1% | PEN Silica 0.1% | PEN Silica 0.1% |
| Coating layer composition | Polyester resin 60 parts Organic particles 40 parts | Polyester resin 60 parts Organic particles 40 parts | Polyester resin 60 parts Organic particles 40 parts |
| t | 0.2 μm | 1.0 μm | 0.2 μm |
| Magnetic layer thickness tM | 0.1 μm | 0.4 μm | 0.4 μm |
| tM + t | 0.3 μm | 1.4 μm | 0.6 μm |
| Young's modulus in the longitudinal direction * | 700 | 680 | 640 |
| Magnetic layer surface roughness SRa | 6 nm | 7 nm | 6 nm |
| 7.7 MHz RF output | +0.2 dB | +0.3 dB | +0.2 dB |
| Tape modulation noise | ±0.0 dB | ±0.0 dB | ±0.0 dB |

* Young's modulus in the longitudinal direction of the magnetic tape (kg/mm²)

TABLE 5

|  | Comp. Ex. 1 | Comp. Ex. 2 | Comp. Ex. 3 | Comp. Ex. 4 |
| --- | --- | --- | --- | --- |
| Polyester film composition | PET Silica 0.1% | PET Silica 0.1% | PET Silica 0.1% | PEN Silica 0.1% |
| Coating layer composition | — | Polyester resin 60 parts Organic particles 40 parts | Polyester resin 60 parts Organic particles 40 parts | Polyester resin 60 parts Organic particles 40 parts |
| t | — | 0.02 μm | 2.4 μm | 0.5 μm |
| Magnetic layer thickness tM | 0.1 μm | 1.1 μm | 1.8 μm | 2.5 μm |
| tM + t | 0.1 μm | 1.12 μm | 4.2 μm | 3.0 μm |
| Young's modulus in the longitudinal direction * | 490 | 500 | 350 | 600 |
| Magnetic layer surface roughness SRa | 10 nm | 9 nm | 6 nm | 8 nm |
| 7.7 MHz RF output | −4.1 dB | −2.4 dB | −0.8 dB |  |
| Tape modulation noise | −3.8 dB | −2.2 dB | −2.0 dB |  |

* Young's modulus in the longitudinal direction of the magnetic tape (kg/mm²)

What is claimed is:

1. A magnetic recording medium comprising:
   as a support film, a biaxially oriented polyester film comprising
   (i) a polyester base film, and
   (ii) a coating layer formed on the surface of the base film, which contains at least one particle selected from the group consisting of silica, silica sol, alumina, alumina sol, zirconium sol, kaolin, talc, calcium carbonate, calcium phosphate, titanium oxide, barium sulfate, carbon black, molybdenum sulfide, antimony oxide sol and crosslinked polymer particles; and
a magnetic layer comprising a magnetic substance dispersed in a resin binder, formed on the surface of said coating layer, and
   wherein the thickness t (μm) of said coating layer, the thickness tM (μm) of said magnetic layer and the average center line roughness (sRa(nm)) of the surface of said magnetic layer satisfy the following formulae (1)–(4);

$$0.01 \leq tM \leq 1.35 \quad (1)$$

$$0.05 \leq t \leq 1.39 \quad (2)$$

$$0.1 < t+tM \leq 1.4 \quad (3)$$

$$sRa < 10 \quad (4)$$

and wherein the magnetic recording medium is produced by a process comprising:
forming the coating layer on the surface of the biaxially oriented polyester film during the film forming process by an in-line coating method, comprising applying a coating solution that forms the coating layer on an unstretched polyester support film and biaxially stretching the applied film, or applying a coating solution that forms the coating layer on a monoaxially stretched polyester support film and stretching the applied film in the direction orthogonal to the initial monoaxial stretching direction,
applying a magnetic coating material on the surface of said coating layer of said support film,
subjecting the magnetic coating material to magnetic field orientation,
drying to evaporate solvent, and
calendering to flatten the surface of said coating layer, so that t, tM and sRa satisfy the above-mentioned formulae (1)–(4).

2. The magnetic recording medium according to claim 1, wherein the coating layer comprises a resin selected from the group consisting of polyamides, polystyrene, polyacrylates, polycarbonates, polyarylates, polyvinyls, polyvinylidenes, polyvinyl butyrals, polyvinyl alcohol, polyurethanes, and a copolymer or a mixture of said resins.

3. The magnetic recording medium according to claim 1, wherein the coating layer contains at least one of an inorganic or organic particles having an average particle diameter of 0.001 to 3.0 μm in an amount not less than 60 wt %.

4. The magnetic recording medium according to claim 1, wherein the polyester base film contains at least one of an inorganic or organic particles having an average particle diameter of 0.001 to 5.0 μm in an amount not more than 10 wt % and comprises at least one layer.

5. The magnetic recording medium according to claim 1, wherein the polyester base film comprises a single film or a laminating-film comprising at least two-layers.

6. The magnetic recording medium according to claim 1, wherein a back coat is provided on the side opposite to the magnetic layer forming side of the support film.

7. The magnetic recording medium according to claim 1, wherein the calendering is conducted at a temperature of not less than 70° C. and under a linear pressure of not less than 200 kg/cm.

8. The magnetic recording medium according to claim 1, wherein said support film having a Young's modulus of not less than 350 kg/mm².

9. The magnetic recording medium according to claim 1, wherein said biaxially-oriented support film is made by heat setting so that the shrink ratio of the film after a 3-minute heat treatment at 100° C. is not greater than 2.0% in both longitudinal and transverse directions.

10. The magnetic recording medium according to claim 1, wherein said coating by said in-line coating method can be conducted by use of reverse roll coater, gravure coater or air doctor coater.

11. A process for forming a recording medium as claimed in claim 1, comprising:
forming the coating layer on the surface of a biaxially oriented polyester film during the film forming process by an in-line coating method, comprising:
applying a coating solution that forms the coating layer on an unstretched polyester support film and biaxially stretching the applied film, or applying a coating solution that forms the coating layer on a monoaxially stretched polyester support film and stretching the applied film in the direction orthogonal to the initial monoaxial stretching direction;
applying a magnetic coating material on the surface of said coating layer of said support film;
subjecting the magnetic coating layer to magnetic field orientation;
drying to evaporate solvent; and
calendering to flatten the surface of said coating layer, so that t, tM and sRa satisfy the formulae (1)–(4)

$$0.01 < tM < 1.35 \quad (1)$$

$$0.05 < t < 1.39 \quad (2)$$

$$0.1 < t+tM < 1.4 \quad (3)$$

$$sRa < 10 \quad (4).$$

* * * * *